United States Patent
Lee

[19]

[11] Patent Number: 5,987,119
[45] Date of Patent: Nov. 16, 1999

[54] APPARATUS FOR AUTOMATICALLY RECOVERING SPEECH PATH OF TELEPHONE TERMINAL AND METHOD THEREFOR

[75] Inventor: Seog-Geun Lee, Gumi, Rep. of Korea

[73] Assignee: SamSung Electronics Co., Ltd., Suwon, Rep. of Korea

[21] Appl. No.: 08/847,610

[22] Filed: Apr. 25, 1997

[30] Foreign Application Priority Data

Apr. 25, 1996 [KR] Rep. of Korea ............ 96-12914

[51] Int. Cl.⁶ ............................................ H04M 1/00
[52] U.S. Cl. .......................... 379/379; 379/377; 379/387
[58] Field of Search .................................... 379/387, 413, 379/379, 381, 32, 377, 93.09, 382, 67, 88, 79

[56] References Cited

U.S. PATENT DOCUMENTS

| | | |
|---|---|---|
| 3,150,237 | 9/1964 | Baldik et al. . |
| 4,109,112 | 8/1978 | Denman et al. ............ 379/451 |
| 4,423,292 | 12/1983 | Turek ........................ 379/379 |
| 4,558,183 | 12/1985 | Corris et al. . |
| 4,640,988 | 2/1987 | Robinton ................ 379/93.05 |
| 4,686,700 | 8/1987 | Perry ........................ 379/183 |
| 4,731,829 | 3/1988 | Bonnet et al. ............ 379/382 |
| 4,736,412 | 4/1988 | Schmidt ................... 379/382 |
| 4,903,291 | 2/1990 | Tsurufuji et al. ........... 379/88 |
| 4,922,529 | 5/1990 | Kiel .......................... 379/387 |
| 4,998,271 | 3/1991 | Tortola et al. ............. 379/32 |
| 5,140,631 | 8/1992 | Stahl ......................... 379/377 |
| 5,291,545 | 3/1994 | Stahl ...................... 379/93.28 |
| 5,390,249 | 2/1995 | Park ......................... 379/393 |
| 5,414,764 | 5/1995 | Watanabe et al. ......... 379/377 |
| 5,442,694 | 8/1995 | Chitrapu et al. .......... 379/373 |
| 5,568,547 | 10/1996 | Nishimura ................ 379/382 |
| 5,592,529 | 1/1997 | Linsker ..................... 379/32 |
| 5,606,593 | 2/1997 | Smith ....................... 379/33 |
| 5,612,997 | 3/1997 | Vallelonga, Sr. et al. .... 379/393 |
| 5,734,712 | 3/1998 | Randahl ................... 379/382 |

OTHER PUBLICATIONS

Korea Utility Model No. 1994–2280 (Application No. 1991–3388) issued on the 14ᵗʰ of Apr. 1994 with a filing date of Mar. 14, 1991 in the name of Jung–Ha Park (total pages: Four (4) provided herewith).

*Primary Examiner*—Reinhard J. Eisenzopf
*Assistant Examiner*—Charles N. Appiah
*Attorney, Agent, or Firm*—Robert E. Bushnell, Esq.

[57] ABSTRACT

An inadvertent off-hook apparatus for use in a telephone system having a handset for automatically restoring an inadvertently off-hook telephone to an on-hook in order to receive an incoming call. The apparatus comprises a current sensing unit comprising a photo-coupler coupled to one of a tip and a ring terminal of the telephone line, for sensing variations of current of the telephone line in response to an incoming call and detecting a handset misplacement signal indicating that the telephone is in an inadvertent off-hook condition; and a control unit connected to the current sensor unit, for disconnecting the voice network from the telephone line to block the speech path in response to the handset misplacement signal, and for connecting the voice network to the telephone line to form the speech path to answer the incoming call.

24 Claims, 5 Drawing Sheets

APPARATUS FOR AUTOMATICALLY RECOVERING SPEECH PATH OF TELEPHONE TERMINAL AND METHOD THEREFOR

CLAIM FOR PRIORITY

This application makes reference to, incorporates the same herein, and claims all benefits accruing under 35 U.S.C. §119 from applications for Apparatus for Automatically Recovering Speech Path of Telephone Terminal and Method Therefor earlier filed in the Korean Industrial Property Office on Apr. 25, 1996, and there duly assigned Ser. No. 96-12914.

BACKGROUND OF THE INVENTION

1. Technical Field

The present invention relates to an apparatus for automatically recovering a speech path of a telephone terminal in a telephone system, and more particularly, relates to an apparatus for automatically recovering a speech path of a telephone terminal whenever a handset is inadvertently left off-hook.

2. Related Art

Generally, telephone systems having a handset must be placed in an on-hook status in order to receive an incoming call. Voice network used during telephone conversation must be disconnected from the telephone lines so that a ring detection unit can respond to the incoming call and generate a ring signal to alert the user of such an incoming call. However, there are instances where the telephone can be inadvertently left off-hook which results in an out-of-order status and consequent loss of incoming call service at least until the user discovers the problem and hangs up the telephone. Such instances typically occur when the user carelessly misplaces the handset and improperly hangs up the telephone. When the handset is carelessly misplaced, an off-hook alert signal in a form of a "howler" tone or a set of distinct audio tones is transmitted from an exchange system to a telephone left off-hook for a period of time in order to alert the user of such an out-of-order status and to remind the user to hang up the telephone. The off-hook alert signal is usually terminated after a short period of time, however. If the user is not in the proximity of the telephone to hear the off-hook alert signal, then the telephone can remain out-of-order for a long period of time.

Consequently, means for automatically restoring service to a telephone that is inadvertently left off-hook has been developed to improve the serviceability and dependability of such telephones. Contemporary apparatus for restoring an off-hook telephone back to an on-hook condition in order to receive incoming calls are disclosed, for example, in U.S. Pat. No. 3,150,237 for Telephone Line Clearing Relay issued to Baldik et al., U.S. Pat. No. 4,109,112 for Telephone Isolation Device issued to Denman et al., U.S. Pat. No. 4,922,529 for Automatic Hangup Apparatus For Restoring Service To Off-Hook Telephones issued to Kiel, U.S. Pat. No. 4,998,271 for Telephone Accessory issued to Tortola et al., U.S. Pat. No. 5,592,529 for Telephone Inadvertent Off-Hook Condition Detector issued to Linsker, U.S. Pat. No. 5,606,593 for Apparatus And Method For Automatically Returning A Telephone Set To An On-Hook Condition issued to Smith, and U.S. Pat. No. 5,612,997 for Off-Hook Disconnect And Reconnect Ringer Device issued to Wallelonga, Sr. et al., and Korea Utility Model Publication No. 94-2280.

For example, U.S. Pat. No. 3,150,237 issued to Baldik et al., discloses a relay switch mechanism which is mechanically coupled to a cradle switch for disconnecting an off-hook telephone from the telephone line in order to restore service to the user. U.S. Pat. No. 4,109,112 issued to Denman et al., discloses a telephone isolation device which uses a magnetic latching relay having restore and disconnect coils for disconnecting the inadvertently left off-hook telephone from the telephone lines. U.S. Pat. No. 4,922,529 issued to Kiel discloses an automatic hang-up apparatus for restoring services to off-hook telephones. The Kiel apparatus monitors for occurrences of: (1) a characteristic howler sent by a local exchange system to warn the telephone customer that the telephone is off-hook, (2) a long period of silence where there is no dial tone, or (3) no movement of a handset for a period of time. Occurrence of any of these is considered an inadvertent off-hook status and the apparatus is automatically switched to an on-hook status. The Kiel apparatus requires, however, a litany of sensor circuits such as an off-hook sensor using relay coils, howler tone sensor, silence sensor including a timer, dial toner sensor, and motion sensor, which all add complexity to a telephone. U.S. Pat. No. 4,998,271 issued to Torlola et al., and U.S. Pat. No. 5,592,529 issued to Linsker also describe detection of a howler tone sent from the local exchange system and other audio signals in order to alert the user that the telephone is in an off-hook condition. U.S. Pat. No. 4,686,700 for Telephone Off-Hook Detector Circuit issued to Perry, U.S. Pat. No. 4,731,829 for Circuit For Detecting Current Variations issued to Bonnet et al., and U.S. Pat. No. 5,140,631 for Apparatus and Method For Determining The State Of A Telephone Line issued to Stahl, describe only detection of the on-hook or off-hook condition of a telephone for subsequent operations.

U.S. Pat. No. 5,390,249 issued to Park and Korean Utility Model Publication No. 94-2280 disclose a speech recovery circuit using three relays connected in parallel to the telephone lines for receiving incoming calls when the telephone handset is placed in an abnormal manner. Similarly, both recent U.S. Pat. No. 5,606,593 issued to Smith and U.S. Pat. No. 5,612,997 issued to Vallelonga, Sr. et al., disclose an apparatus which includes at least one relay switch for detecting if a telephone is off-hook and automatically returning an off-hook telephone back to an on-hook condition in order to receive an incoming call.

As I have noted however, conventional speech path recovery apparatus necessarily requires the use of relay switches and other communication operation and maintenance circuits. Consequently, the quality of voice communication can deteriorate due to coils of the relay, and the production cost of such an apparatus can be increased.

SUMMARY OF THE INVENTION

Accordingly, it is therefore an object of the present invention to provide an apparatus for restoring incoming call service to an inadvertently off-hook telephone.

It is also an object to provide an apparatus in a form which is reliable in operation and inexpensive to manufacture for automatically returning a telephone from an inadvertent off-hook condition to an on-hook condition in order to receive an incoming call over a telephone line.

It is another object to provide an apparatus in a form which can be readily integrated into a newly manufactured telephone for detecting if a telephone is inadvertently off-hook according to a variation of current supplied from an exchange system in a telephone line and for returning the telephone from an inadvertent off-hook condition to an on-hook condition in order to receive an incoming call over a telephone line.

These and other objects of the present invention can be achieved by an inadvertent off-hook apparatus for use in a telephone terminal having a voice network electrically connected to a telephone line from an exchange system for forming a speech path in response to an incoming call. The apparatus comprises a current sensor unit comprising one photo-coupler coupled to one of a tip and a ring terminal of the telephone line, for sensing variations of current of the telephone line in response to an incoming call and detecting a handset misplacement signal indicating that the telephone is in an inadvertent off-hook condition; and a control unit connected to the current sensor unit, for disconnecting the voice network from the telephone line to block the speech path in response to the handset misplacement signal, and for connecting the voice network to the telephone line to form the speech path to answer the incoming call.

According to a preferred embodiment of the present invention, the current sensor unit is constructed by a photo-coupler having a pair of light emitting diodes connected in parallel with said one of said tip terminal and ring terminal of the telephone line, and a photo-transistor connected to respond to the light emitting diodes and disposed between a power source terminal and a ground terminal; a resistor connected in parallel to the photo-coupler for protecting the photo-coupler from an over-voltage input through the telephone line; and a comparator having a first terminal coupled to receive an output of the photo-coupler and a second terminal coupled to receive a reference voltage, for generating the handset misplacement signal when the telephone is in an inadvertent off-hook condition.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
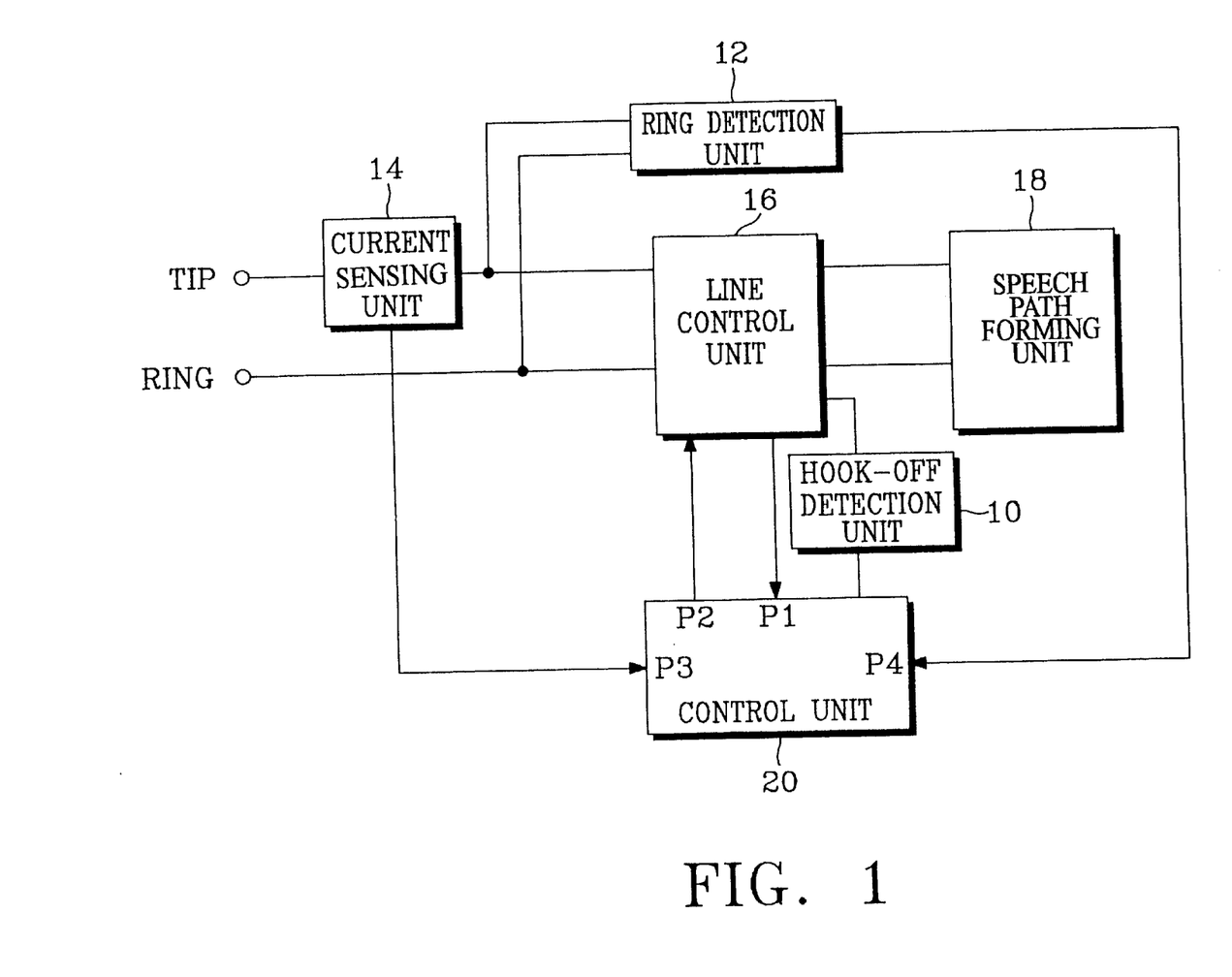
FIG. 1 is a block diagram of an inadvertent off-hook apparatus for use in a telephone system constructed according to the principles of the present invention.

Referring now to the drawings and particularly to FIG. 1, which illustrates an inadvertent off-hook apparatus for use in a telephone system constructed according to the principles of the present invention. The inadvertent off-hook apparatus includes a hook-off detection unit 10 for detecting when a telephone handset is off-hook, a ring detection unit 12 for detecting an incoming call from a tip and ring terminal of a telephone line, a line control unit 16 and a speech path forming unit 18 which serve as a voice network for forming a speech path in response to an incoming call over the telephone line, and a control unit 20 for controlling overall operations of a telephone terminal.

As shown in FIG. 1, the control unit 20 controls overall operations of the telephone terminal, including automatically disconnecting a speech path formed by the speech path forming unit 18 upon detection of an inadvertent off-hook condition of a telephone handset in response to an incoming call from the telephone line, and connecting a speech path formed by the speech path forming unit 18 to respond to the incoming call after the inadvertent off-hook telephone is returned to an on-hook condition. The ring detection unit 12 is coupled to a telephone line for detecting a ring signal received from the telephone line and generating a ring detected signal to the control unit 20. The current sensing unit 14 is coupled to either a tip terminal or a ring terminal of the telephone line for generating a handset misplacement detection signal to the control unit 20 by sensing the variation of the current of the telephone line. The line control unit 16 connects or blocks a telephone loop of the telephone line under control of the control unit 20. The speech path forming unit 18 connects the line control unit 16 to the telephone handset and outputs a telephone line voice signal which is received by the handset via the line control unit 16. The voice signal from the handset is output to the telephone line through the line control unit 16. The hook-off detection unit 10 detects the status of an hook-off according to a hook switch's on/off and provides an off-hook detection signal to the control unit 20.

Although the current sensing unit 14 as shown in FIG. 1 is coupled to the tip terminal, it is noted here that it can be coupled to the ring terminal to sense the same current variations from the telephone line. In addition, the current sensing unit 14 can also be coupled to the tip terminal or the ring terminal between the line control unit 16 and the speech path forming unit 18.

Figure 2:
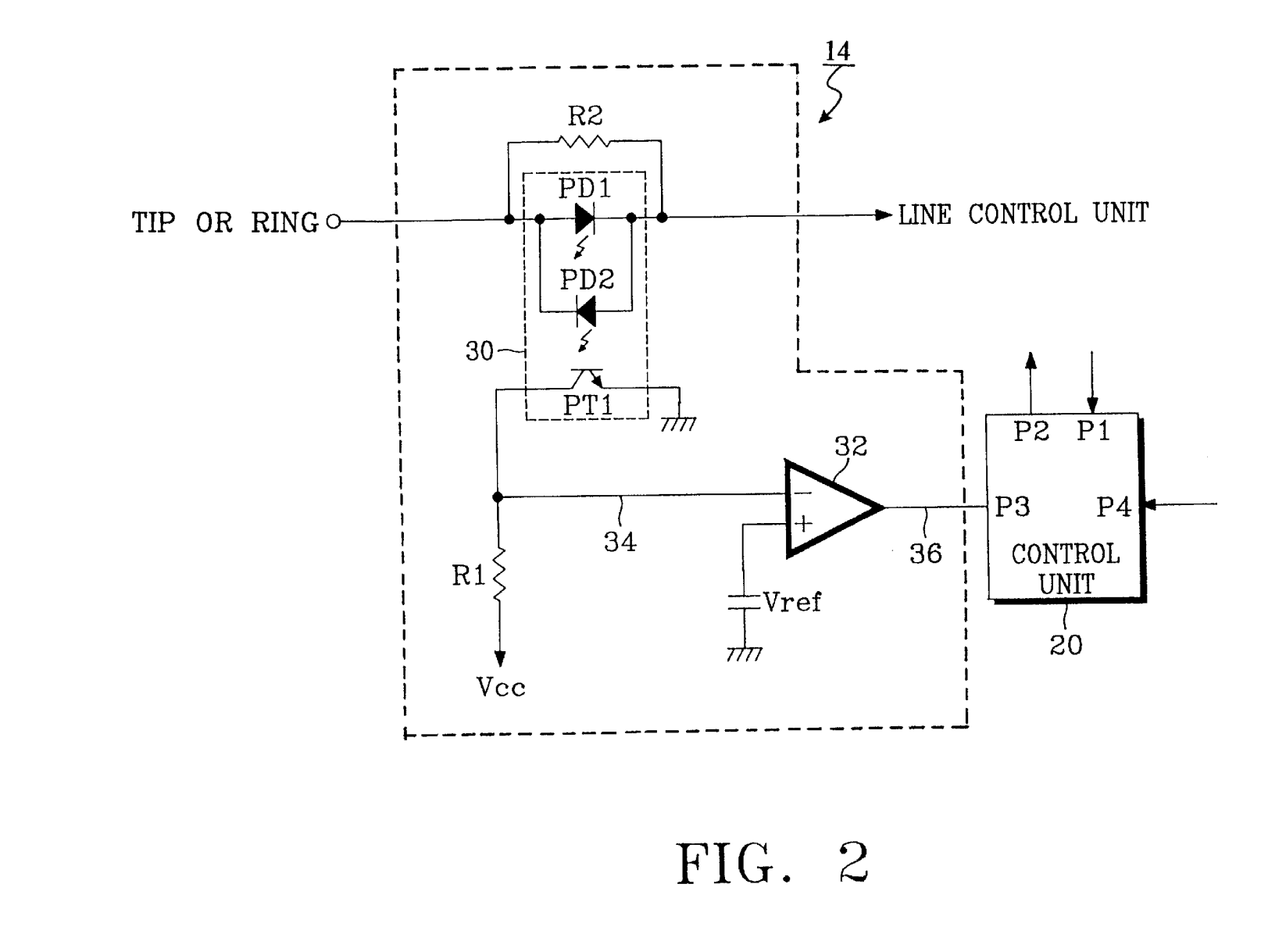
FIG. 2 is a detailed circuit diagram of a preferred embodiment of a current sensing unit 14 of the apparatus as shown in FIG. 1.

Turning now to FIG. 2 which illustrates a preferred embodiment of a current sensing unit 14 of the apparatus as shown in FIG. 1. According to this embodiment, the current sensing unit 14 includes a photo coupler 30 for detecting variations of a current flowing in a telephone line and a comparator 32 for producing a handset misplacement detection signal to the control unit 20. The photo coupler 30 includes a first photo diode PD1 coupled between the tip terminal or the ring terminal and the line control unit 16, and a second photo diode PD2 coupled in parallel with the first photo diode PD1 thereof in order to bias differently to both terminals of the photo diode PD1 thereof. In addition, a resistor R2 is coupled in parallel with both terminals of the photo diode PD1 of the photo coupler 30. The first photo transistor PT1 of the photo coupler 30 has a grounded emitter and receives the light emitted from the photo diodes PD1 and PD2, thereby outputting a handset misplacement detection signal. As a full-up resistor, the resistance R1 is coupled between a power source voltage Vcc and the photo transistor PT1 of the photo coupler 30. Resistance and impedance of R1 and R2 can be taken, for example, 5.6K (Ohms) and 24K (Ohms)

Comparator 32 has a positive terminal (+) coupled to a reference voltage Vref and a negative terminal (−) coupled to a collector of the photo transistor PT1 of the photo coupler 30 for outputting the handset misplacement detection signal.

Additionally, in case that the handset misplacement detection signal output to the collector thereof is neither a logic "high" state nor a logic "low" state, that is, an intermediated state, the comparator 32 is used in order for the control unit 20 to sense the data, since the control unit 20 can not sense data in the above condition.

Figure 3:
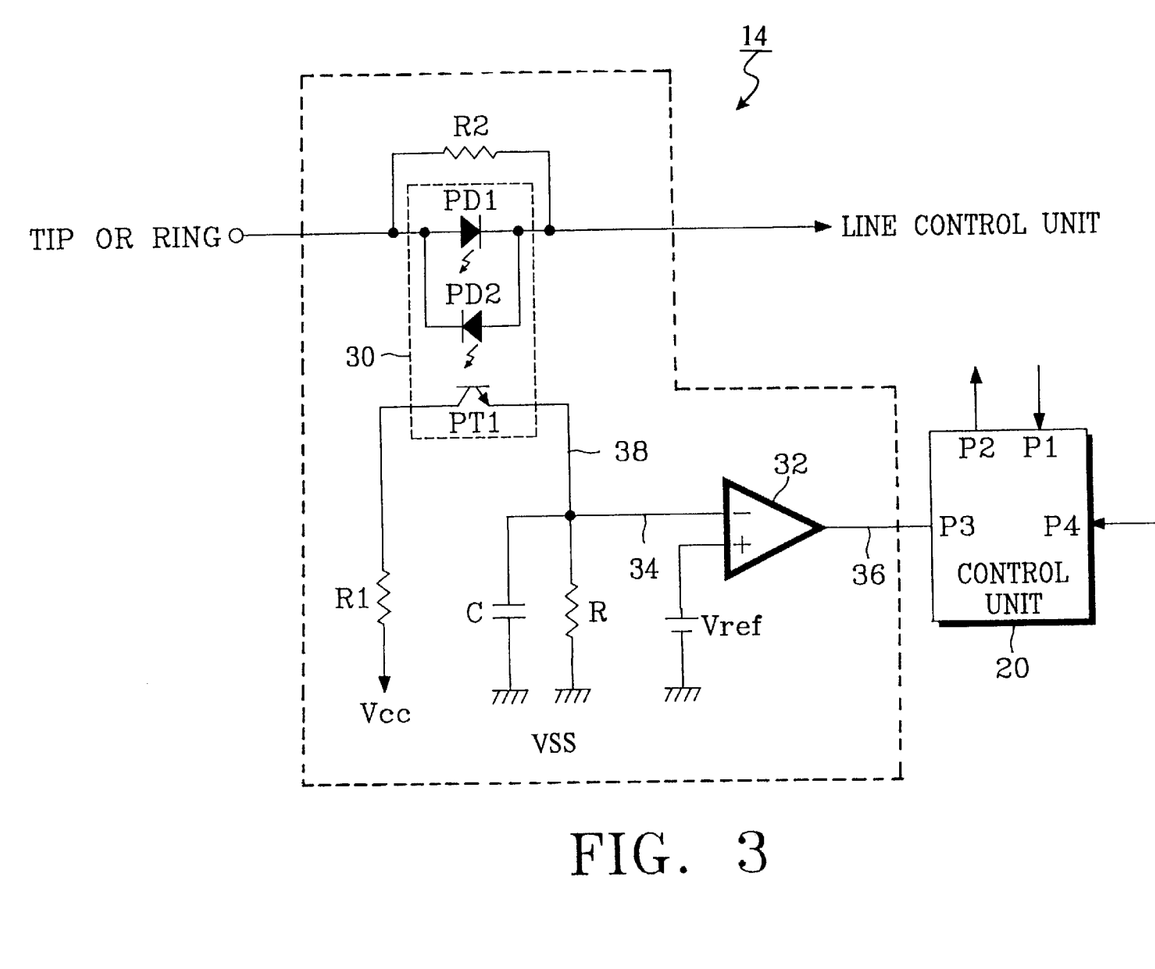
FIG. 3 is a detailed circuit diagram of another embodiment of a current sensing unit 14 of the apparatus as shown in FIG. 1.

FIG. 3 illustrates another embodiment of the current sensing unit 14 of the apparatus as shown in FIG. 1. The construction of the current sensing unit of FIG. 3 is the substantially similar to that of FIG. 2 except that the comparator 32 is coupled to the emitter of the photo transistor PT1, and a resistor R and capacitor C are further coupled between the emitter of the photo transistor PT1 and a ground terminal VSS in parallel with each other, so that an output terminal of the comparator 32 is coupled to port P3 of the control unit 20.

Figure 4:
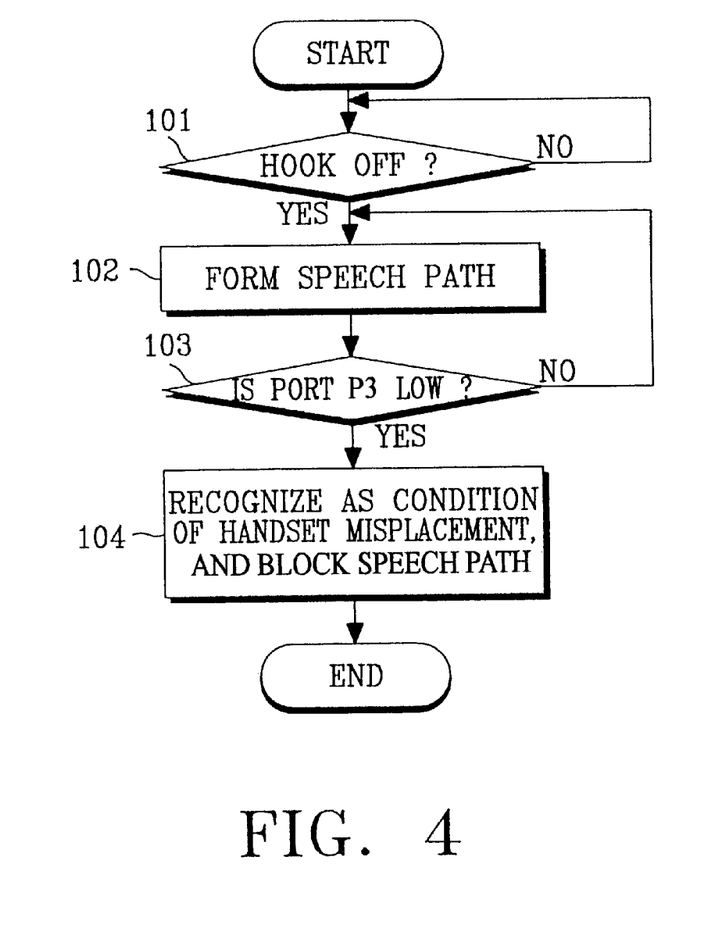
FIG. 4 is a control flow chart for blocking a speech path upon detection of an inadvertent off-hook telephone according to an embodiment of the present invention.

Refer now to FIG. 4 which is a control flow chart for blocking a speech path upon detection of an inadvertent off-hook condition or misplacement of a handset, and FIGS. 5A–5E which shows waveforms detected by variations of current supplied from a M10CN exchange system in accordance with the telephone line status according to an embodiment of the present invention.

Operations of the preferred embodiment of the present invention will be described in detail with reference to FIGS. 1 and 5A–5E herein below.

In service provided from an exchange station to a subscriber, there is a minor difference according to the type of exchange system. Typically, when a handset is picked up by the caller, the telephone is in an hook-off condition and the caller receives a dial tone from the exchange system. The caller then dials a desired telephone number after receipt of the dial tone in order to communicate with another subscriber at a counterpart telephone system. At this time, if the counterpart telephone system is on-line, the exchange system provides the subscriber with a busy tone. In addition, if the dial key is not pushed for a given period of time during dialing of the telephone number, the exchange system provides a voice message such as "the dial is late" to the subscriber. Accordingly, different types of exchange systems provide a different tone service, even though the speech current is normally flowed before the exchange system is turned to a silent condition. When the exchange system is in a silent condition, the current indicative of the misplacement state of the handset is supplied to the telephone line. As a result, for convenience of explanation, the M10CN exchange system will be described as one example as below.

Figure 5A:
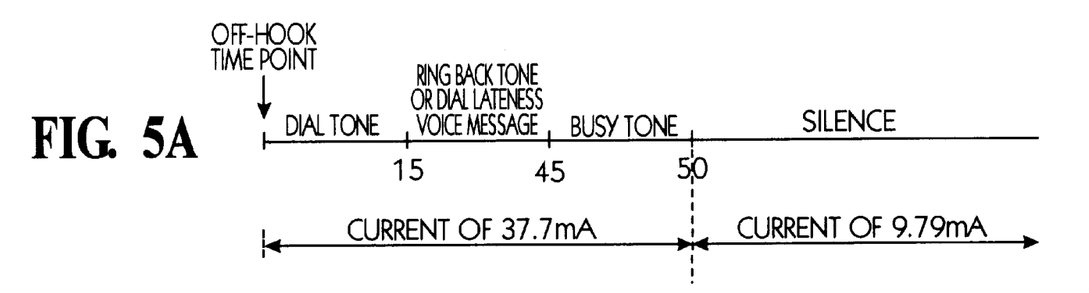
FIGS. 5A–5E are waveform diagrams of variation of current supplied from a M10CN exchange system in accordance with the telephone line status according to an embodiment of the present invention.

As shown in FIG. 5A, the M10CN exchange system sends the dial tone for 15 seconds when a subscriber picks up the handset of the telephone system and sends the voice message such as "the dial is late" or a ring back tone for 30 seconds if there is no key signal. And then, if there is no action, the exchange system sends a busy tone for 5 seconds to the subscriber and thereafter goes to the silent state. At this time, the M10CN exchange system recognizes that the telephone is in a low ohmic state, i.e. the normal state of communication before going to the silent state, so that the current of 37.7 mA (milliamperes) can flow to the telephone line of the telephone. In the meanwhile, the exchange system recognizes that the telephone is in a high ohmic state, i.e. the misplacement state of the handset as soon as the telephone goes to the silent state, so that the current of 9.79 mA (milliamperes) can flow to the telephone line thereof. Consequently, when a given period of time, for example, 50 seconds, has expired since the handset is hooked off in the M10CN exchange system, the current of 9.79 mA as the high ohmic state flows to the telephone line. In such M10CN exchange system, the current of 37.7 mA, as the low ohmic state that is the normal communication state, can be changed according to the length of speech path and the current of 9.79 mA, as the high ohmic state, can be also changed therein. Conclusively, the current values as mentioned in the above are not necessarily absolute values therein.

Figure 5B:
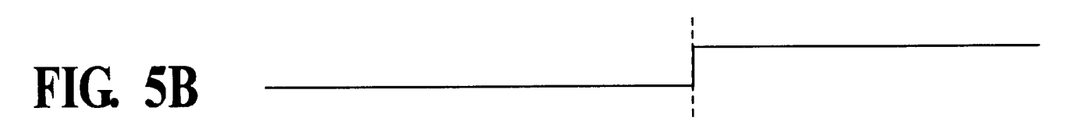
Figure 5C:
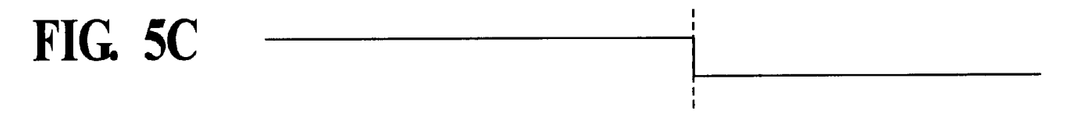

Therefore, in the normal communication state, the current of 37.7 mA as the low ohmic state flows to the telephone line of the telephone. As a result, the photo diode PD1 or PD2 of the photo coupler 30 is completely turned on, thereby emitting light. At this time, the photo transistor PT1 is completely turned on and outputs a low signal as shown in FIG. 5B to the negative terminal (−) of the comparator 32 via the line 34. The comparator 32 compares the signal input to the negative terminal (−) thereof with a predetermined reference voltage Vref applied to the positive terminal (+), and outputs a high signal as shown in FIG. 5C to port P3 of the control unit 20. Here, while the predetermined reference voltage Vref can be determined as 2 Volts–2.5 Volts, however, that can be changed in accordance with the length of the telephone line.

When the telephone is in a silent state as shown in FIG. 5A, the current of 9.79 mA as the high ohmic state flows to the telephone line by means of the exchange system. Here, since low current flows to the photo diodes PD1 and PD2 of the photo coupler 30, the photo transistor PT1 is not turned on, so that the high signal, as a handset misplacement detection signal as shown in FIG. 5B can be output to the negative terminal (−) of the comparator 32 via the line 34. At this time, the comparator 32 compares the signal inputted to the negative terminal (−) thereof with the predetermined reference voltage Vref applied to the positive terminal (+) thereof, thereby a signal of a logic "low" level is output to port P3 of the control unit 20 as shown in FIG. 5C. In the case that an output signal of photo transistor PT1 is neither in the logic "high" state nor the logic "low" state upon the current of 9.79 mA as the high ohmic state is applied to the photo diode PD1 or PD2 of the photo coupler 30, the comparator 32 is used to recover the above output signal thereof to the logic "low"state or the logic "high" state exactly. In this way, the control unit 20 detects whether the telephone is in a normal state or a handset misplacement state (i.e., inadvertent off-hook state) according to the logic states of a signal input through port P3, thereby controlling the line control unit 16 for forming or blocking the speech path. Further, the resistor R2 connected in parallel with both terminals of the photo diode PD1 protects the photo coupler 30 when an over-voltage is input through the telephone line.

Figure 5D:
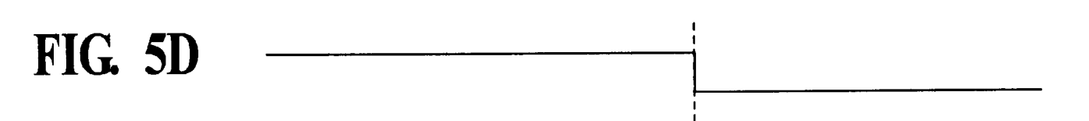
Figure 5E:
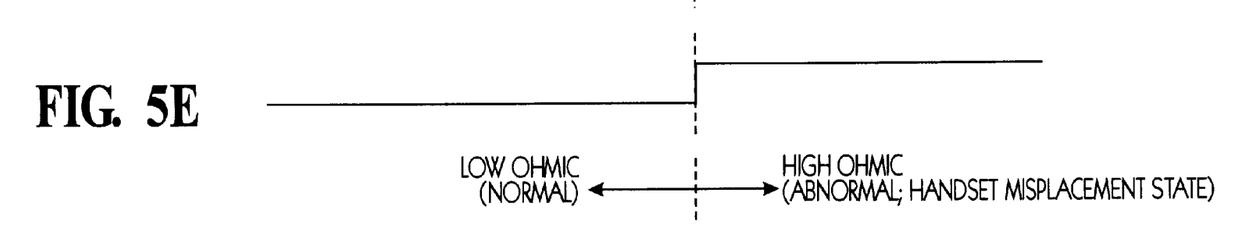

Refer back to FIG.3, the current of 37.7 mA as the low ohmic state flows to the telephone line in the normal communication state. Thus, the photo diode PD1 or PD2 of the photo coupler 30 is completely turned on, thereby emitting the light. At this time, the photo transistor PT1 is completely turned on, so that the logic high signal is output to the negative terminal (−) of the comparator 32 through line 34. The comparator 32 compares the signal input to the negative terminal (−) thereof with the predetermined reference voltage Vref applied to the positive terminal (+), so that the logic low signal as shown in FIG. 5E is output to port P3 of the control unit 20. At this time, while the reference voltage Vref is determined to 2 Volts–2.5 Volts, however, it can be changed according to the length of the line.

When the telephone is in the abnormal or silent state as shown in FIG. 5A, the current of 9.79 mA as the high ohmic state flows to the telephone line in the exchange system. Thus, low current flows to the photo diodes PD1 and PD2 of the photo coupler 30 and accordingly, the photo transistor PT1 is not completely turned on, thereby outputting the logic low signal, that is, a handset misplacement detection signal as shown in FIG. 5D, to the negative terminal (−) of the comparator 32 through the line 34. At this time, the comparator 32 compares the signal inputted to the negative terminal (−) thereof with the predetermined reference voltage Vref applied to the positive terminal (+), thereby outputting the logic high signal to the port P3 of the control unit 20 through the line 36 as shown in FIG. 5E. In this way, the control unit 20 detects whether the telephone is in a normal state or a handset misplacement state according to the logic states of a signal, thereby controlling the line control unit 16 for forming or blocking the speech path.

As described above, in the handset misplacement state after forming the speech path, the control unit 20 detects the above state, thereby recovering the speech path. Hereinafter, the operation of the control unit 20 will be given in detail with reference to FIG. 4. At step 101, the control unit 20 determines whether or not the handset is hooked off through the hook-off detection unit 10. Here, if the handset is not off-hook, the control unit 20 returns to step 101. However, if the handset is off-hook, the control unit 20 proceeds to step 102, thereby forming the speech path by controlling the line control unit 16. Then, the control unit 20 determines at step 103 via the current sensing unit 14 whether or not the logic low signal is detected via port P3. At this time, if the logic low signal is not detected via port P3, the control unit 20 returns to step 102, thereby forming the speech path. However, if the logic low signal is detected via port P3, the control unit 20 proceeds to step 104, thereby recognizing that the telephone is in the handset misplacement state, controlling the line control unit 16, and blocking the speech path.

Thus, since the speech path of the telephone terminal is blocked, the exchange system recognizes that the telephone is now capable of receiving a normal incoming call from another party. Further, when another party of from the counterpart telephone system makes a phone call, the exchange system can generate a ring signal to the telephone terminal to alert the user of an incoming call even if the handset is inadvertently off-hook.

As apparent from the foregoing, the present invention has an advantage in that since the control unit detects variations of current provided from the exchange system in the case of forming the speech path and then dialing the telephone number or of detecting the busy tone in the on-line state and then misplacing the handset, the incoming call of the telephone terminal can be received even when the handset is in a handset misplacement state (i.e., inadvertent off-hook condition). In addition, since the handset misplacement state is detected by using one photo coupler, the structure of the circuit is far more simple than that of a prior art circuit where three relays are used and accordingly the production cost thereof can be reduced drastically.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for use in a telephone terminal, said telephone terminal comprising a voice network comprising a speech path forming unit for forming a speech path for a telephone call, said voice network for coupling to a telephone line from an exchange system, said apparatus comprising:

a current sensing unit comprising at least a photo-coupler coupled to one of a tip terminal and ring terminal of the telephone line, said photo-coupler for sensing variations of current of the telephone line, said photo-coupler capable of detecting whether a telephone is in one of a normal state and a handset misplacement state, and said current sensing unit for generating a handset misplacement signal if said handset misplacement state is detected indicating that the telephone is in an inadvertent off-hook condition; and a control unit connected to the current sensing unit, said control unit for disconnecting said voice network from the telephone line to block the speech path in response to the handset misplacement signal, and said control unit for connecting said voice network to the telephone line to form the speech path for a telephone call.

2. The apparatus as claimed in claim 1, wherein said current sensing unit comprises:

said photo-coupler comprising a pair of light emitting diodes connected in parallel with one of said tip terminal and said ring terminal of the telephone line, and a photo-transistor connected to respond to the light emitting diodes and disposed between a power source terminal and a ground terminal; and a comparator having a first terminal coupled to receive an output of said photo-coupler and a second terminal coupled to receive a reference voltage, said comparator for generating said handset misplacement signal when the telephone is in an inadvertent off-hook condition.

3. The apparatus as claimed in claim 2, further comprising a resistor connected in parallel to said photo-coupler for protecting said photo-coupler from an over-voltage input through the telephone line.

4. The apparatus as claimed in claim 3, wherein said reference voltage corresponds proximately to a voltage of 2 Volts to 2.5 Volts.

5. The apparatus as claimed in claim 1, wherein said current sensing unit comprises:

said photo-coupler comprising a pair of light emitting diodes connected in parallel with one of said tip terminal and said ring terminal of the telephone line, and a photo-transistor connected to respond to the light emitting diodes and disposed between a power source terminal and a ground terminal;

a resistor connected in parallel to said photo-coupler; and s a comparator having a first terminal coupled to said power source terminal coupled to said phototransistor and a second terminal coupled to receive a reference voltage, said comparator for generating said handset misplacement signal when the telephone is in said inadvertent off-hook condition.

6. The apparatus as claimed in claim 1, wherein said current sensing unit comprises:

said photo-coupler comprising a pair of light emitting diodes connected in parallel with one of said tip terminal and said ring terminal of the telephone line, and a photo-transistor connected to respond to the light emitting diodes and disposed between a power source terminal and a ground terminal;

a resistor connected in parallel to said photo-coupler; and a comparator having a first terminal coupled to said ground terminal coupled to said photo-transistor and a second terminal coupled to receive a reference voltage, said comparator for generating said handset misplacement signal when the telephone is in said inadvertent off-hook condition.

7. The apparatus as claimed in claim 5, wherein said comparator generates said handset misplacement signal upon said photo-coupler sensing variations of current as a high ohmic state at the telephone line supplied from said exchange system.

8. The apparatus as claimed in claim 5, wherein said comparator generates said handset misplacement signal when an output voltage of said photo-coupler is less than said reference voltage.

9. The apparatus as claimed in claim 6, wherein said comparator generates said handset misplacement signal when an output voltage of said photo-coupler is less than said reference voltage.

10. The apparatus as claimed in claim 1, wherein said voice network is disconnected to the telephone line in response to the handset misplacement signal without use of a relay.

11. An apparatus for use in a telephone terminal, said telephone terminal comprising a voice network comprising a speech path forming unit for forming a speech path for a telephone call, said voice network for coupling to a telephone line from an exchange system said apparatus comprising:

a photo-coupler coupled to one of a tip terminal and a ring terminal of the telephone line, said photo-coupler for sensing variations of current of the telephone line, said photo-coupler capable of detecting whether a telephone is in one of a normal state and a handset misplacement state, said photo-coupler comprising a pair of light emitting diodes connected in parallel with one of said tip terminal and said ring terminal of the telephone line, and a photo-transistor connected to respond to the light emitting diodes and disposed between a power source terminal and a ground terminal;

a comparator having a first terminal coupled to receive an output of said photo-coupler and a second terminal coupled to receive a reference voltage, said comparator for generating a handset misplacement signal if said handset misplacement state is detected when the telephone is in an inadvertent off-hook condition; and a control unit connected to the comparator for disconnecting said voice network from the telephone line to block the speech path in response to the handset misplacement signal, and said control unit for connecting said voice network to the telephone line to form the speech path for a telephone call.

12. The apparatus as claimed in claim 11, further comprising a resistor connected in parallel to said photo-coupler for protecting said photo-coupler from an over-voltage input through the telephone line.

13. The apparatus as claimed in claim 11, wherein said voice network is disconnected from the telephone line in response to the handset misplacement signal without use of a relay.

14. Method for automatically recovering a speech path of a telephone terminal, said method comprising the steps of:

sensing variations of current flowing through one of a tip terminal and a ring terminal of a telephone line from an exchange system using a current sensing unit, said current sensing unit comprising a photo-coupler that is coupled to one of said tip terminal and said ring terminal of the telephone line, said photo-coupler sensing said variations of said current flowing to detect whether a telephone is in one of a normal condition and an inadvertent off-hook condition, and said current sensing unit generating a handset misplacement signal if said inadvertent off-hook condition is detected indicating that the telephone is in said inadvertent off-hook condition;

disconnecting a voice network that is electrically connected to the telephone line for forming a speech path from the telephone line to block the speech path in response to the handset misplacement signal; and connecting said voice network to the telephone line to form the speech path for a telephone call.

15. The method as claimed in claim 14, wherein said handset misplacement signal is generated in response to detection of said current flowing having a value of 9.79 mA as a high ohmic current supplied from said exchange system.

16. The method as claimed in claim 14, wherein said current sensing unit comprises:

said photo-coupler comprising a pair of light emitting diodes connected in parallel with one of said tip terminal and said ring terminal of the telephone line, and a photo-transistor connected to respond to the light emitting diodes and disposed between a power source terminal and a ground terminal;

a resistor connected in parallel to said photo-coupler; and a comparator having a first terminal coupled to said power source terminal coupled to said photo-transistor and a second terminal coupled to receive a reference voltage, said comparator for generating said handset misplacement signal when the telephone is in said inadvertent off-hook condition.

17. The method as claimed in claim 14, wherein said current sensing unit comprises:

said photo-coupler comprising a pair of light emitting diodes connected in parallel with one of said tip terminal and said ring terminal of the telephone line, and a photo-transistor connected to respond to the light emitting diodes and disposed between a power source terminal and a ground terminal;

a resistor connected in parallel to said photo-coupler; and a comparator having a first terminal coupled to said ground terminal coupled to said photo-transistor and a second terminal coupled to receive a reference voltage, said comparator for generating said handset misplacement signal when the telephone is in said inadvertent off-hook condition.

18. The method as claimed in claim 16, wherein said comparator generates said handset misplacement signal when an output voltage of said photo-coupler is less than said reference voltage.

19. The method as claimed in claim 17, wherein said comparator generates said handset misplacement signal when an output voltage of said photo-coupler is less than said reference voltage.

20. The method as claimed in claim 14, wherein said voice network is disconnected from the telephone line in response to the handset misplacement signal without use of a relay.

21. An apparatus for use in a telephone terminal, said telephone terminal comprising a voice network comprising a forming unit for forming a speech path for a telephone call, said voice network for coupling to a telephone line from an exchange system, said apparatus comprising:

a photo-coupler comprising light emitting diodes and at least a photo-transistor responding to said light emitting diodes, said photo-coupler coupled to the telephone line for sensing current variations of the telephone line, said photo-coupler capable of detecting whether a telephone is in one of a normal condition and an inadvertent off-hook condition;

a comparator responsive to an output of said photo-coupler for generating a handset misplacement signal when said photo-coupler detects the telephone is in said inadvertent off-hook condition; and a control unit for disconnecting said voice network from the telephone line to block the speech path in response to the handset misplacement signal, and said control unit for connecting said voice network to the telephone line to form the speech path for a telephone call.

22. The apparatus as claimed in claim 21, further comprising a resistor connected in parallel to said photo-coupler for protecting said photo-coupler from an over-voltage input through the telephone line.

23. The apparatus as claimed in claim 21, wherein said photo-transistor is disposed between a power source terminal and a ground terminal, a resistor is connected in parallel to said light emitting diodes, and said comparator has a first terminal coupled to said power source terminal coupled to said photo-transistor and a second terminal coupled to receive a reference voltage for generating said handset misplacement signal when the current variations of the telephone line are at a high ohmic state.

24. The apparatus as claimed in claim 21, wherein said voice network is disconnected from the telephone line in response to the handset misplacement signal without use of a relay.

* * * * *